J. W. IVORY.
TORPEDO GUARD FOR SHIPS, BOATS, OR VESSELS.
APPLICATION FILED APR. 18, 1917.

1,263,064.

Patented Apr. 16, 1918.
3 SHEETS—SHEET 1.

INVENTOR
James W. Ivory.
BY Diedersheim + Fairbanks.
ATTORNEYS

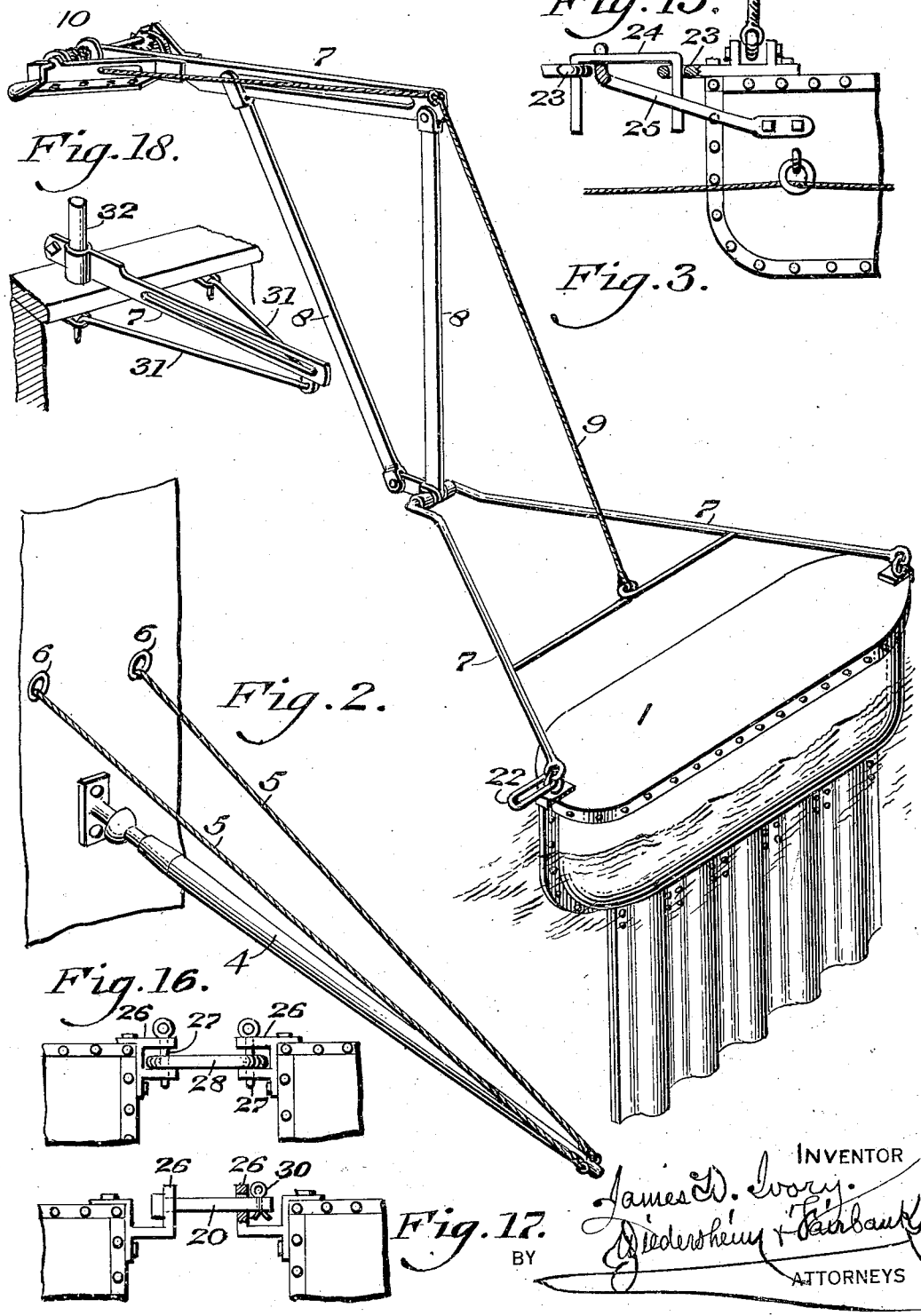

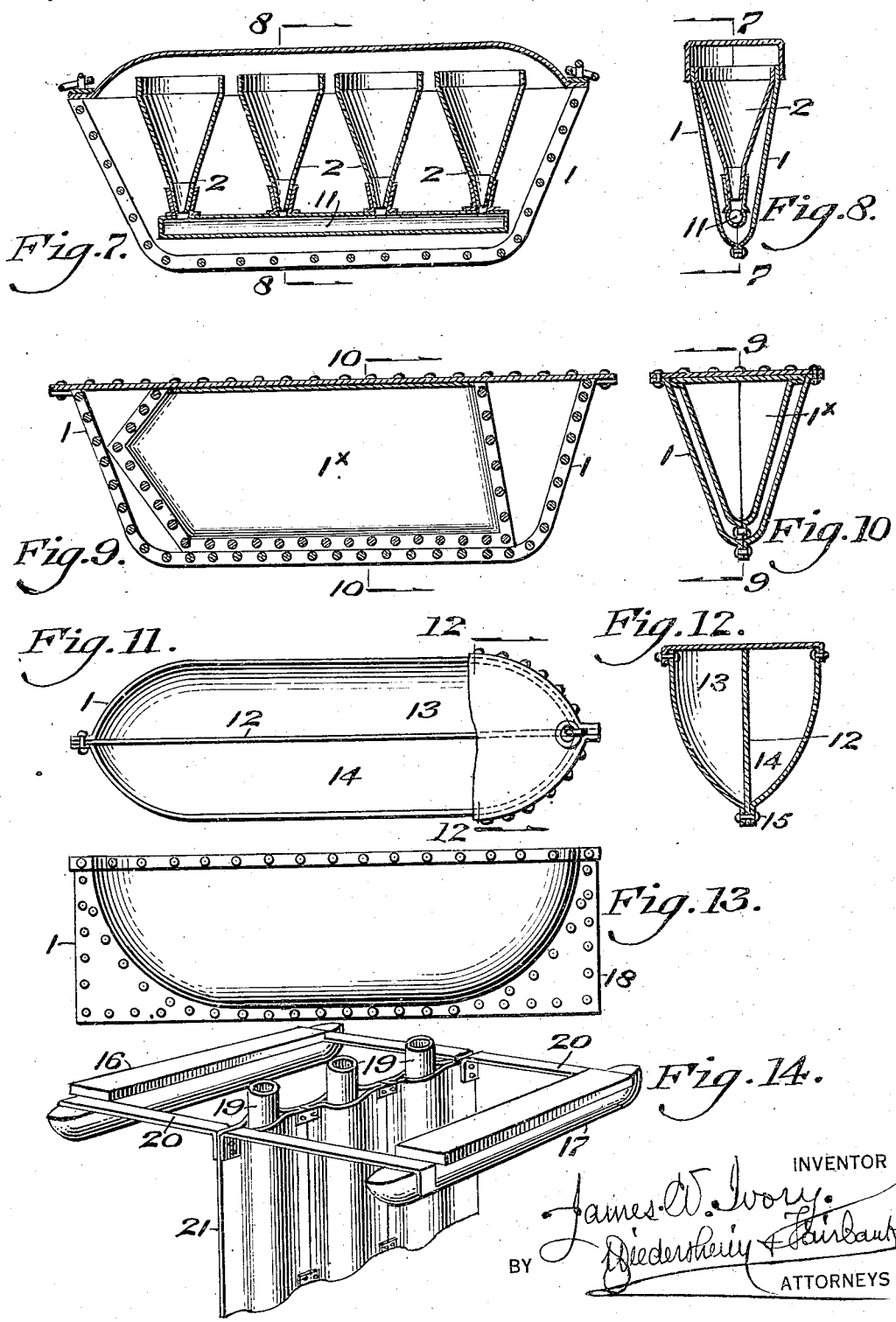

UNITED STATES PATENT OFFICE.

JAMES W. IVORY, OF PHILADELPHIA, PENNSYLVANIA.

TORPEDO-GUARD FOR SHIPS, BOATS, OR VESSELS.

1,263,064. Specification of Letters Patent. Patented Apr. 16, 1918.

Application filed April 18, 1917. Serial No. 162,918.

*To all whom it may concern:*

Be it known that I, JAMES W. IVORY, a subject of the King of Great Britain, residing in the city and county of Philadelphia, State of Pennsylvania, have invented a new and useful Torpedo-Guard for Ships, Boats, or Vessels, of which the following is a specification.

My invention consists of means embodying pontoons, or floats connectible with a ship, a boat or like vessel, for guarding the same from being subjected to the injurious action of a torpedo or mine, so that while said means may be destroyed by the latter, the ship, boat or like vessel may escape injury, as will be hereinafter set forth.

The invention is satisfactorily illustrated in the accompanying drawing, but the important instrumentalities thereof may be varied, and so it is to be understood that the invention is not limited to the specific details shown and described.

Fig. 2 represents a perspective view of a movable support for the guard.

Fig. 3 represents a perspective view of another form of support.

Fig. 7 represents a longitudinal section on line 7—7 Fig. 8.

Fig. 8 represents a transverse section on line 8—8 Fig. 7.

Fig. 9 represents a longitudinal section of another embodiment on line 9—9 Fig. 10.

Fig. 10 represents a transverse section on line 10—10 Fig. 9.

Fig. 11 represents a top or plan view partly broken away of one of the said embodiments.

Fig. 12 represents a transverse section on line 12—12 Fig. 11.

Fig. 13 represents a side elevation of the embodiment shown in Figs. 11 and 12.

Fig. 14 represents a pontoon suspended from booms, as will be hereinafter described.

Figs. 15, 16, 17 and 18 represent embodiments of devices employed for coupling and uncoupling the pontoons or floats employed and for supporting the same.

Similar numerals of reference indicate corresponding parts in the figures.

Referring to the drawings:—

Figure 1:
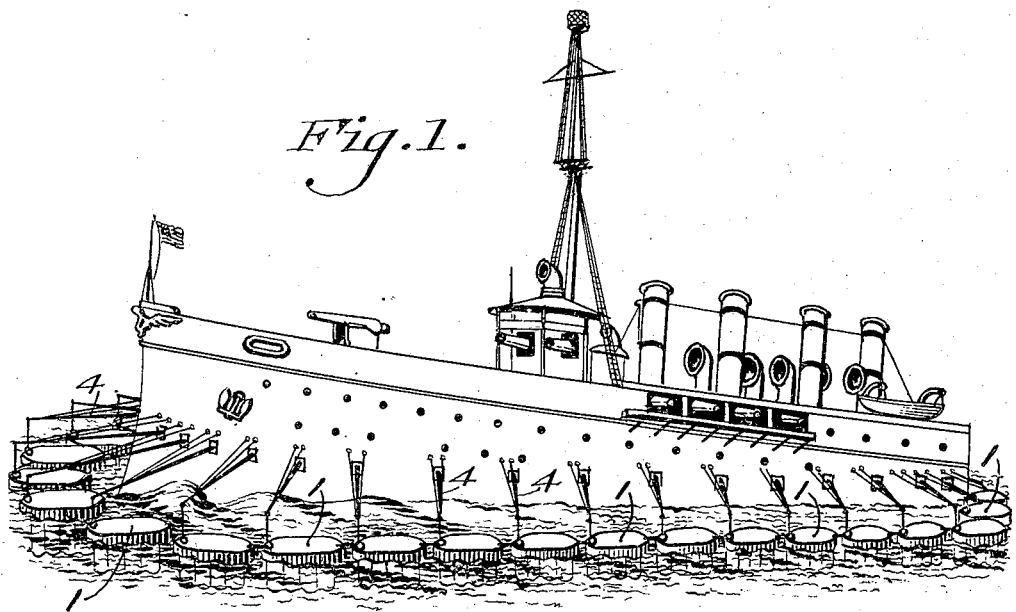
Figure 1 represents a perspective view of a ship, and a guard therefor embodying my invention.

1 designates a series of pontoons or floats formed of buoyant bodies which are closed to the water, and in which are contained the open ended air contained tubes 2, as flues supplemental to the chambers in the bodies of the pontoons or floats, said pontoons or floats being connected flexibly and arranged as a cordon around the hull of the ship 3 and movable therewith, and carried by the cranes 4 which are mounted pivotally with the sides of the hull of the ship, whereby the pontoons may rise and fall with the waves independent of the ship, and so serve to guard the hull of the ship in the lateral motions thereof on the water, avoiding strain on the crane and the connected parts with the ship, preventing wrenching of the pontoons from the crane and the latter from the hull.

In practice, the pontoons or bodies are properly ballasted, and the air contained tubes extend deep into the water, so that their lower ends are below the bottom proper of the pontoons or floats. To the outer ends of said cranes are attached the ropes, cables, or chains 5, which pass through the thimbles or eyelets 6 which are secured to the sides of the hull, said ropes or chains entering the hull so as to be within reach thereof, whereby they may be operated to raise the pontoons or floats from the water, or to lower the same thereto according to requirements.

Another form of mechanism is a crane slotted projecting arm extending from the top of the hull of a boat to which it is fastened by plates on the said crane. These cranes are on every side of the boat many of them about twenty or twenty-five feet apart, and each crane carrying a pontoon or float separately. The crane itself is about twelve feet in length and extends outward over the water at nearly right angles to the hull of the boat. The upper crane is slotted in the direction of its length, and in the slot is fitted the end of a movable downwardly-extending arm 8 which is hinged at its base to another similar arm 8 which is hinged to the extreme end of said upper crane. To these arms are the double bars that diverge from one another and connected to either end of the pontoon by a clevis coupling and all serve to carry the pontoon or float along with the boat. On this crane is the mechanism for raising and lowering the pontoon or float consisting of the rope or cable 9, and the windlass 10, the latter being attached to the upper part of the ship and being adapted to have said rope 9 which is connected with a cross bar or brace of the crane 7 adapted to be wound and unwound from said windlass, the effect of which is evident. These pontoons or floats may be disconnected from their cranes and projecting arms when necessary as on entering the harbor by simply removing the bolt from the clevis connection.

These pontoons and booms supporting the pontoon while they may be carried and supported by the crane independent of each other may be connected by a coupling, as shown in Fig. 16, which coupling consists of an angular shaped loop that engages with aperture plates extending forward and backward on each pontoon or boom. Each pontoon carrying a forked arm to the right and left side end of the pontoon or boom and is so arranged that when the boat may be lifted, the forked arm will carry the other socket from the aperture in the plate of the contiguous pontoon, so that no matter which pontoon or boom is raised the connecting coupling is raised with it, and hence from the aperture forward or backward plate of such pontoon, which is evident.

In Figs. 7 and 8, the pontoon or float 1 contains the tubes 2 which are funnel shape or flaring at the top, and connected at the bottom by the communicating pipe 11.

In Fig. 9, the pontoon 1 has an inclosed auxiliary hollow chamber 1ˣ.

In Fig. 11 the pontoon or float has therein a longitudinally extending diaphragm 12 forming the chambers 13 and 14 respectively on opposite sides thereof, said diaphragm being riveted or otherwise firmly secured to the bottom of the side plates of the pontoon as at 15, and extending to the cover cap of the latter.

In Fig. 12, the pontoon has therein the vertically-extending diaphragm 15 forming the chambers 16 and 17 at the sides of the same.

In Fig. 13 the pontoon or float is composed of a hollow body with marginal reinforcings 18.

In Fig. 14 I show plates 21 of a pontoon suspended from booms 16 and 17. Tubes 19 are inclosed in said plates, and the latter are attached to said plates by the bars 20.

Figure 4:
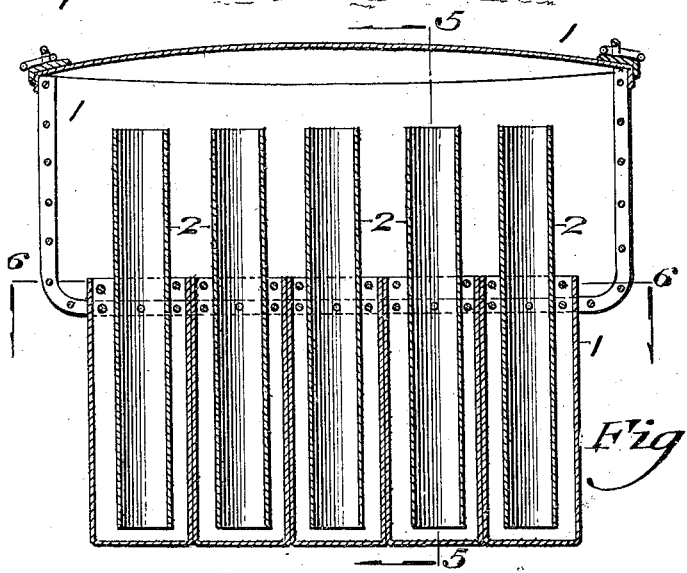
Figs. 4 and 5 represent vertical sections at a right angle to each other of the guard illustrated in Fig. 1 on an enlarged scale, on lines respectively 4—4, Fig. 6, 5—5 Fig. 4.
Figure 5:
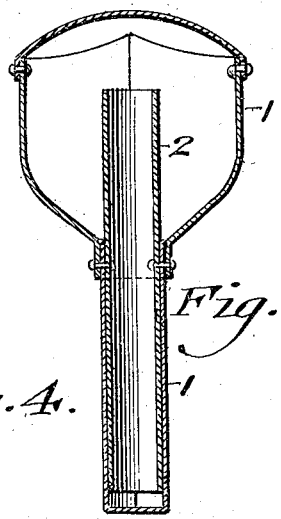
Figure 6:
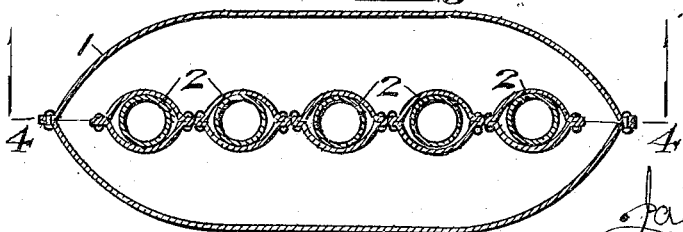
Fig. 6 represents a horizontal section on line 6—6 Fig. 4.

It will be seen, referring to Figs. 1, 3, 4, and 5, that the tubes 2 extend in part upwardly into the pontoons proper, and in part below the same so as to have their lower portions considerably below the bottom of said pontoons, and so well sunk into the water so that while the pontoons are properly ballasted their lower portions are adapted, one or more to receive the force of a torpedo and so may be fractured, opened or destroyed when the force of the torpedo is deflected upwardly into said tubes as flues or auxiliary chambers of the pontoons with air and water entering said tubes in upward direction and so following the line of least resistance, whereby said water, air, and force are carried to the top of the pontoons and through the same to the surface of the water and ejected above the same without being impacted on the hull of the ship, serving also to prevent forcible action on the water between the pontoon and ship.

The same is true when the pontoons come in contact with a mine, they then being acted upon by the same as by a torpedo projectile, the pontoons themselves being blown up or destroyed and saving the ship. It is evident that increased boiler forces and steam power may be required to propel a vessel carrying this cordon of pontoons, and it may be necessary also to supplement schooners and merchant vessels in their power by having one or more tug boats attached to the vessel to assist in carrying these pontoons especially where regular speed is to be kept up in order that the journey may not be prolonged in crossing from one port to another. These extra tug boats are not shown in the drawing as I deem it unnecessary so to do.

Various forms of coupling the pontoons may be employed, such as rings or links 22, as most clearly shown in Fig. 3, or by eyes 23 on adjacent pontoons and a clevis 24 removably fitted in said eyes, and a combined arm 25 on the pontoon for raising the same, as shown in Fig. 15, or by heads 26 on adjacent pontoons, coupling pins 27 in said heads, and a coupling link 28 with which said pins engage, as shown in Fig. 16, or a headed bolt 29 in lieu of said link 28, with a key 30 to the end thereof to prevent displacement of said bolt, see Fig. 17, it being evident that when said clevis and bolts are properly removed adjacent pontoons are disconnected or uncoupled, and so each pontoon may be raised from the water when so desired.

As a precaution, a hawser may be passed around the cordon of pontoons through rings on the latter, so that should the couplings of the pontoons disconnect, the cordon will not be broken.

The action of the arm 8 in the slot in the upper member of the crane beam 7 is to allow a controlling motion of the pontoon as it slides back and forth in said groove or slot.

The hinged downward arm 8 at the end of the crane beam 7 and the hinged double diverging bars of the lower crane members 7 hinged to the base of same, all of which acting in concert prevent a sudden jerking of the pontoon or pontoon booms as the ship may launch in a storm. The slot with its connecting arm also admits the nearness of the approach of the pontoon toward the vessel. The pontoons are to be at least eighteen feet from the hull of the boat which they are guarding.

In Fig. 18, I show braces 31 for firmly supporting the slotted member of the crane 7, and a post 32 for mounting said member on a proper portion of the ship.

Having thus described my invention what I claim as new and desire to secure by Letters Patent, is:—

1. In a guard for a ship of the character stated, a closed hollow pontoon proper, means for supporting the same on the hull of a ship removed therefrom, and an auxiliary flue-like chamber in said pontoon in communication with the interior of the latter.

2. In a guard for a ship of the character stated, a closed hollow pontoon proper, means for supporting the same on the hull of a ship removed therefrom, and an open-ended tubular member inclosed in said pontoon in communication with the interior thereof.

3. In a guard for a ship of the character stated, a closed hollow pontoon proper, means for supporting said pontoon removed from the hull of the ship and permit it to rise and fall independent of the latter, and a vertically-arranged open-ended tubular member inclosed in said pontoon and in communication with the interior thereof.

4. In a guard for a ship of the character stated, a closed hollow pontoon proper, means for supporting said pontoon removed from the hull of the ship and permit it to rise and fall independently of the latter, and a vertically-arranged open-ended tubular member inclosed in said pontoon and in communication with the interior thereof, said pontoon having a downward extension, a portion of said member occupying said pontoon proper, and another portion thereof occupying said downward extension.

JAMES W. IVORY.

Witnesses:
 JOHN A. WEIDERSHEIM,
 N. BUSSINGER.

Copies of this patent may be obtained for five cents each, by addressing the "Commissioner of Patents, Washington, D. C."